Patented Aug. 11, 1942

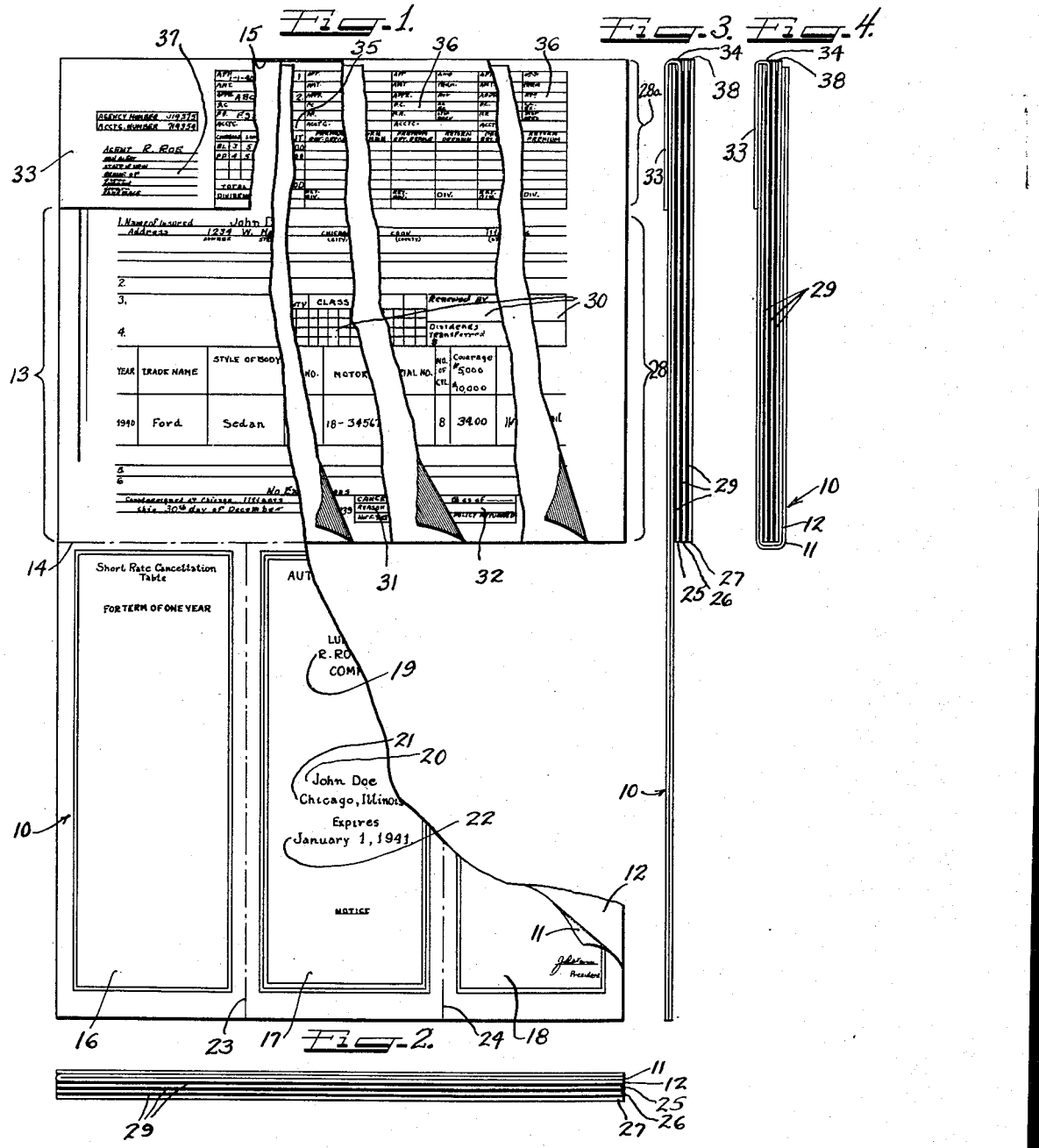

2,292,681

UNITED STATES PATENT OFFICE 2,292,681

MANIFOLD ARRANGEMENT

Carl H. Anderson, Chicago, Ill., assignor to Lumbermens Mutual Casualty Co., Chicago, Ill., a corporation of Illinois Application March 29, 1941, Serial No. 385,818

8 Claims. (Cl. 282—9)

This invention is a continuation-in-part of my copending application, Serial No. 320,869, filed February 26, 1940, since matured on May 20, 1941, in Patent No. 2,242,500, and relates to manifold arrangements or assemblies of sheets of writing paper which are used with sheets of carbon paper for producing a plurality of copies in one operation.

More particularly this invention relates to insurance policies and other forms which are generally filled out at the same time as the policy, the matter to be written on the other forms being in part identical with that written on the policy and in part different therefrom.

In filling out some forms of insurance policies, such as automobile insurance policies, for example, it is necessary to prepare copies of the information written in on the policy for the home office of the insurance company, the branch office of the insurance company, and for the agent. In addition to the information contained upon the policy itself, the copies mentioned above must also have other information, such as the name of the agent and bookkeeping information, which is not to appear on the original policy. It is also customary for the policy to be arranged so that it can be folded to a size of approximately 3½ by 8½ inches with the name and address of the policyholder and the expiration date appearing on the outside of the folded policy. Since insurance policies are generally folded so that the portion bearing the insurance policy is on the inside, the name of the policyholder and the other information which is to appear on the outside of the folded policy must be written on that portion of the policy as well as in the appropriate place in the contract portion of the policy.

It has hitherto been the practice to provide blank insurance policies and copies of the policies in sets interleaved with sheets of carbon paper so that the information which is to appear on both the policy itself and on the copies can be written simultaneously upon the policy and the copies. After this information has been written, it has hitherto been necessary to separate the policy from the copies and to then write upon the copies the information which is not to appear on the policy and to write the name and address of the insured and the expiration date of the insurance upon that portion of the policy which is to form the outside of it when it is folded. Since the writing of an insurance policy is generally done on a typewriter, these operations require three separate insertions of sheets of paper into the typewriter, two of these insertions being of sheets interleaved with carbon paper, all of which must be kept straight and in registry.

A principal object of the present invention is to provide an insurance policy and copies of the policy arranged in such a manner as to enable all of the information referred to above to be written upon them with only one insertion of paper into the typewriter.

Another object of the present invention is to provide an arrangement of an insurance policy and copies with sheets of carbon paper interleaved therewith, the policy being capable of being folded in such a manner as to retain the copies and sheets of carbon paper in place in relation to the policy without it being necessary to connect all of them together by adhesive or other similar means.

In accordance with the principal features of this invention, there is provided a blank insurance policy and a plurality of copies of the portion of the policy which is to be filled out according to the particular contract being written. The copies are secured together along one edge and interleaved with carbon paper with the policy capable of being so folded as to hold the copies and carbon paper in registry when inserted into a typewriter. In addition the first policy copy is provided with a detachable flap upon which may be written the information which is desired to place upon the copies of the policy but not upon the policy itself. The flap overlaps a portion of the policy where nothing is to be written regarding the particular contract to be embodied in the policy, but the writing on the flap is transferred to the policy copies.

A perforated line is provided at the fold between the flap and the first record sheet for ease in removing the flap. When the combined flap and first record sheet are glued to additional record sheets, sufficient glue usually seeps through the perforations at the fold line to glue the double edges of the policy in its position inserted between the flap and the first record sheet. It is to be understood, however, that this connection of the policy is not necessary.

Other objects and features of the present invention will appear from the following detailed description and the accompanying claims, the description referring to the accompanying drawing, in which:

Figure 1 is a plan view of one of the preferred forms of the invention, the upper sheets of which are torn away in order to show the underlying sheets;

Figure 2 is an end view of the form of invention shown in Figure 1 as seen from the bottom;

Figure 3 is an end view of the form of the invention shown in Figures 1 and 2, as seen from the side; and, Figure 4 is a view similar to Figure 3, of the form of the invention shown in Figures 1, 2 and 3 as folded before being used.

The particular form of the invention shown in the drawing is an automobile insurance policy having three copies, one copy being for the home office of the insurance company, one copy being for the branch office, and the third copy being for the agent. The policy is longitudinally folded along its center line to provide the sheets 11 and 12 of approximately 10 inches in width. These particular dimensions, of course, form no part of the invention itself and are given merely by way of example.

The policy 10 is printed on both sides, the printed insurance contract being on the inside of the folded sheets 11 and 12 and on the underside of the sheet 12 (not shown in the drawing) with the portion of the contract to be filled in being on the upper side of the sheet 11. This arrangement of the policy permits writing in all of the details of the individual insurance contract, such as the name of the insured, the description of the particular automobile to which the insurance applies, and the amount of the insurance, in the form of "declarations" which are referred to in the insurance contract itself.

As shown in Figure 1, the declarations numbered 1 to 6 on the policy are all located in the area 13 on the upper side of the policy sheet 11 between the center 14 and the upper edge 15. The lower half of the upper side of the policy sheet 11 is divided into three panels 16, 17 and 18; the central panel 17 bearing the name 19 of the insurance company and places 20, 21 and 22 for the name and address of the insured and the expiration date of the policy. The other two panels 16 and 18 may carry information of interest to the policyholder. This arrangement permits the policy 10 to be folded transversely along the center line 14 and then folded longitudinally along the lines 23 and 24 between the three panels 16, 17 and 18 so that the declarations in the space 13 are all on the inside of the folded policy, while the name 20, address 21 of the insured, and the expiration date 22 of the insurance are on the outside. It may be noted that the name 20, address 21, and the expiration date 22 on the panel 17 which forms the front of the folded policy are written parallel to the writing in the declaration in the space 13 and that this permits the writing in both places to be done with one insertion of the policy into the typewriter.

Directly underneath the upper half of the policy 10 are three sheets of paper 25, 26 and 27, the last two of which are one-half of the size of either sheet 11 or 12 and whose lower portions 28 are printed with forms similar to the form for the declarations in the space 13 on the policy. Sheets of carbon paper 29 placed directly above each of the record sheets 25, 26 and 27 cause the simultaneous writing on the record sheets of the matter which is written in the declarations in the space 13 of the policy when the policy is being filled out. If desired the record sheets 25, 26 and 27 may be provided with places 30, 31 and 32 for recording information, such as the date of cancellation of the policy or of a renewal of the policy, obtained after the policy is issued. These places 30, 31 and 32 may be located under printed portions of the declarations where there is nothing to be filled out in issuing the policy.

The first record sheet 25 is approximately three inches longer than the record sheets 26 and 27. This additional length is folded over to form a flap 33 (Figures 1, 3 and 4) and if desired may be perforated along the fold line at a position such as indicated at 34.

The upper portions 28a of the record sheets 25, 26 and 27 lying under the flap 33 are provided with places 35 and 36 for recording information which is not to appear on the policy itself or which it is desired to record at the top of the record sheets for convenience in filing and bookkeeping and also for recording additional information which is not at hand when the policy is filled out. The flap 33 is provided with a printed form 37 similar to and directly above the portions 35 and 36 of the printed forms of the record sheets to be filled in at the same time as the policy. Thus the writing which is to be placed on the upper portions 28a of the record sheets 25, 26 and 27 can be written on the flap 33 and will be transferred to the record sheets through the carbon sheets 29, but it will not be written on or transferred to the policy sheet 10, particularly the sheet 11 thereof.

The record sheet 25 together with its flap 33 and the record sheets 26 and 27 are secured along their upper edges by a layer of adhesive 38 applied to their edges in the same manner as common pads of writing paper are secured together. Usually, slight amounts of adhesive will seep through the perforations 34 to connect the adjacent upper edges of the sheets 11 and 12 of the policy 10 to the flap 33 and the record sheets 25, 26 and 27. The folded policy 10 is inserted with its upper portion between the flap 33 and the first record sheet 25. The sheets of carbon paper 29 are inter-leaved with the policy 10 and the record sheets 25, 26 and 27, but terminate short of their upper edges so that they are not secured by the adhesive and can be very readily removed. Before the policy is filled out, the carbon sheets are retained in place by the lower half of the policy which is folded up in back of the carbon and record sheets, as shown in Figure 4.

It is to be understood, however, that the carbon sheets, because they are not connected to the policy 10 and record sheets 25, 26 and 27, may be interleaved either when the manifold arrangement is originally assembled or by the typist when the policy is to be filled out in a typewriter. As sheets of carbon paper are usually available to the typist, they need form no part of the assembly for shipping purposes, thereby saving on transportation costs and making the handling thereof much easier.

When the policy is to be written or filled out, the assembly described above is picked up, and the lower half of the policy 10 is unfolded from the position shown in Figure 4 to the position shown in Figures 1 and 3, and the upper end of the assembly is inserted into a typewriter and brought around into the writing postion. The writing which is to appear only on the record sheets 25, 26 and 27 is then typed on the flap 33, which is the first portion of the assembly to reach the writing position in the typewriter. Duplicates of this writing are formed on the record sheets 25, 26 and 27 through the sheets of carbon paper 29, but the policy 10 is unaffected because there is no carbon paper under the flap 33. The assembly comprising the policy, the record sheets, the flap, and the sheets of carbon paper, is then advanced in the typewriter and the declarations in the area 13 below the flap 33 on the upper half of the policy are filled in. The writing done in this area, of course, appears on the policy for it is typed directly on the face of the policy, and also appears on the record sheets underneath the policy. When this part of the policy has been filled in, the assembly is advanced still further through the typewriter until the policy is in the position for writing in the name, address and expiration date in the panel 17 which is to form the outside of the folded policy. The writing 20, 21 and 22 on this portion of the policy is not reproduced upon the record sheets 25, 26 and 27 because they and the carbon paper 29 above them do not extend under that portion of the policy. As a matter of fact, when the policy has been advanced to a position for writing in the name, address, and expiration date on the panel 17, the adhesively secured record sheets and the loose interleaved carbon sheets may be removed from the folded policy 10. After the lower portion of the policy 10 is filled in, the assembly, or the policy 10 only if the record sheets have been removed, is then removed from the typewriter, the flap 33 is torn off the first record sheet 25 along the perforated line 34 and is thrown away, having served its purpose. The loose interleaved carbon paper is separated from the record sheets, the latter are then ready to be filed and the policy 10 is ready to be signed and folded for delivery to the insured.

From the foregoing, it will be seen that I have provided an assembly of an insurance policy and a plurality of record sheets upon which all of the information to be placed thereon, at the time the policy is written, can be typed in with one insertion of the assembly in a typewriter. My invention thus eliminates the need of reinserting the record sheets in the typewriter without the policy and keeping the record sheets and the carbon sheets in registry while doing this. It will therefore be seen that I have materially simplified the mechanical process involved in writing insurance and, because of this, I have also reduced the possibility of mistakes being made in filling out the forms assembled to the policy.

While I have illustrated and described my invention as embodied in a particular form of insurance policy, it will be obvious that it may be adapted to other forms of insurance policies and even to records relating to matters other than insurance. My invention, therefore, includes not only what I have shown and described and constructions closely similar thereto, but any arrangement which falls within the terms of any of the following claims.

I claim as my invention:

1. A manifold set for simultaneously filling in an insurance policy and a record thereof, comprising a blank policy having places indicated thereon for writing in the details of the particular insurance contract, said places being spaced from one edge of said policy, a record sheet shorter than and extending under said policy from said one edge thereof and having similarly indicated places located directly under the corresponding places on the policy and having other places indicated thereon for writing which is not to appear on said policy, said other places being located between said first places and said edge, and a flap being detachably secured to said record sheet and overlying said policy above said other places and having similarly indicated places located directly over said other places on said record sheet.

2. A manifold set for simultaneously filling in an insurance policy and a plurality of records thereof, comprising a blank policy having places indicated thereon for writing in the details of the particular insurance contract, said places being spaced from one edge of said policy, a plurality of record sheets in superposed relation under and extending partially along the length of said policy and having similarly indicated places located directly under the corresponding places on the policy and having other places indicated thereon for writing which is not to appear on said policy, said other places being located between said first places and said edge, and a flap being detachably secured to one of said record sheets and overlying said policy above said other places and having similarly indicated places located directly over said other places on said record sheets, the portion of said policy extending beyond said record sheets being arranged to be folded to underlie the bottom record sheet and extend in opposed relation to said flap.

3. A manifold set for simultaneously filling in an insurance policy and a record thereof, comprising a blank policy having places indicated thereon for writing in the details of the particular insurance contract, said places being spaced from one edge of said policy, a record sheet lying under said policy and having similarly indicated places located directly under the corresponding places of the policy and having other places indicated thereon for writing which is not to appear on said policy, said other places being located between said first places and said edge, said blank policy being longer than said record sheet to provide an extension having places indicated thereon for writing in additional details which are not to appear on said record sheet, a flap integral with said record sheet and overlying said policy above said other places and having similarly indicated places located directly over said other places on said record sheets, and carbon paper lying between said policy and said record sheet, said policy extension being arranged to be folded to underlap the back of said record sheet and extend in a direction opposite to said flap.

4. A manifold set for simultaneously filling in an insurance policy and a plurality of records thereof, comprising a blank policy having places indicated thereon for writing in the details of the particular insurance contract, said places being spaced from one edge of said policy, a plurality of record sheets of shorter length and lying under said policy having similarly indicated places located directly under the corresponding places on the policy and having other places indicated thereon for writing which is not to appear on said policy, said other places being located between said first places and said edge, a flap overlying said policy above said other places and having similarly indicated places located directly over said other places on said record sheets, means detachably securing said flap and said record sheets along adjacent edges, and sheets of carbon paper lying loosely between said policy and said record sheets, the portion of said policy extending beyond the record sheets being arranged to be folded around adjacent edges of said record sheets opposite said first adjacent edges to underlap the bottom record sheet and extend in a direction opposite to said flap, said folded extension and said securing means coacting to hold said sheets of carbon paper in their proper positions.

5. A manifold set for simultaneously filling in an insurance policy and a plurality of records thereof, comprising a blank policy longitudinally folded along the center line and having spaces indicated on the outside thereof for writing in the details of the particular insurance contract, said places being spaced from one edge of said policy, a plurality of record sheets lying under said policy and having similarly indicated places located directly under the corresponding places on the policy and having other places indicated thereon for writing which is not to appear on said policy, said other places being located between said first places and said edge, a flap overlying said policy above said other places and having similarly indicated places located directly over said other places on said record sheets, means detachably securing said flap and said record sheets together along adjacent edges, said flap being provided with perforations for facilitating removal of said flap from said record sheets, and adjacent edges of said folded policy being connected to and between said flap and record sheets by said means through said perforations.

6. A manifold set for simultaneously filling in an insurance policy and a plurality of records thereof, comprising a blank policy folded longitudinally along its center line and having places indicated on the outside thereof for writing in the details of the particular insurance contract, said places being spaced from the upper edge of said policy, a plurality of record sheets lying under and extending to one edge of said policy and having similarly indicated places located directly under the corresponding places on the policy and having other places indicated thereon for writing which is not to appear on said policy, said other places being located between said first places and said edge, a portion of said policy at the end opposite said one edge thereof extending beyond said record sheets, a flap integral with the first record sheet adjacent said policy and overlying said policy at said one edge thereof and above said other places and having similarly indicated places located directly over said other places on said record sheets, means detachably securing said flap, record sheets and policy together along edges adjacent said one edge of said policy, said flap and its record sheets being provided with perforations therebetween for facilitating removal of said flap from said record sheets, said extending portion of said policy being arranged to be folded to underlap the bottom record sheet, and sheets of carbon paper lying between said policy and said record sheets and retained in place by the coaction of said securing means and said extending portions of the policy.

7. A manifold set for simultaneously filling in an insurance policy and a plurality of records thereof, comprising a blank policy folded longitudinally and transversely along its center lines and having places indicated on the upper half of the outside thereof for writing in the details of the particular insurance contract, said places being spaced down from the upper edge thereof, record sheets lying under said upper half of said policy and having similarly indicated places located directly under the corresponding places on the policy and having other places indicated thereon for writing which is not to appear on said policy, said other places being located between said first places and said upper edges, a folded flap integral with the record sheet adjacent said folded policy and overlying said policy above said other places and having similarly indicated places located directly over said other places on said record sheets, a line of perforations on said flap, a layer of adhesive connecting said flap and record sheets together along adjacent edges, said adhesive connecting said policy to said record sheets through the perforations on said flap, and carbon paper lying between said policy and said record sheets, the lower half of said policy being folded up under said record sheets and preventing downward sliding of said carbon sheets.

8. A manifold set for simultaneously filling in an insurance policy and a record thereof, comprising a blank policy folded to provide adjacent sheets having places indicated thereon for writing in the details of a particular insurance contract, a plurality of record sheets in superposed relation under said policy and having similarly indicated places located directly under the corresponding places on the policy, at least one of said record sheets extending partially along the length of said policy, one end portion of said policy extending beyond said one partially extending record sheet and having spaces thereon for writing in details not to appear on said one record sheet, and means at the end of said policy opposite its said extending end for connecting said policy to one of the record sheets and for connecting the plurality of record sheets together.

CARL H. ANDERSON.